Figure 1:
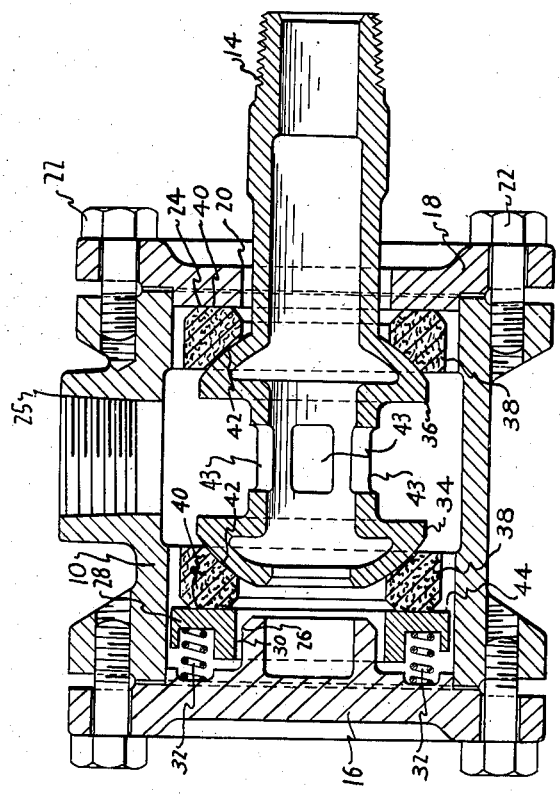

Sept. 7, 1943.　　　L. D. GOFF ET AL　　　2,328,898

ROTARY JOINT

Filed Jan. 16, 1941

Inventors
LEONARD D. GOFF and
ROLLO D. MONROE
By Beaman & Langford
Attorney

Patented Sept. 7, 1943

2,328,898

UNITED STATES PATENT OFFICE 2,328,898

ROTARY JOINT

Leonard D. Goff and Rollo O. Monroe, Three Rivers, Mich., assignors to The Johnson Corporation, Three Rivers, Mich., a corporation of Michigan Application January 16, 1941, Serial No. 374,671

2 Claims. (Cl. 285—96.3)

The present invention relates to improvements in rotary pressure joints, being an improvement over the joint construction shown in United States Patent No. 1,929,635, granted October 10, 1933, to Leonard D. Goff.

One of the objects of the present invention is to reduce the cost of maintenance of joints of the aforesaid type in service by designing the construction to make it more readily re-machinable and to enable the use of a renewable wear plate at the nipple end of the joint.

Another object is to reduce the cost of production of joints of the aforesaid type by simplifying the construction of the rotated nipple.

A further object is to provide a thrust plate actuated by a plurality of spring members in a rotary joint of the type described to lessen the possibility of failure of the joint in service due to spring destruction.

These and other objects and advantages residing in the arrangement, combination and construction of parts will become apparent from a consideration of the following detailed description of the illustrated form of the invention and from the annexed claims.

Figure 2:
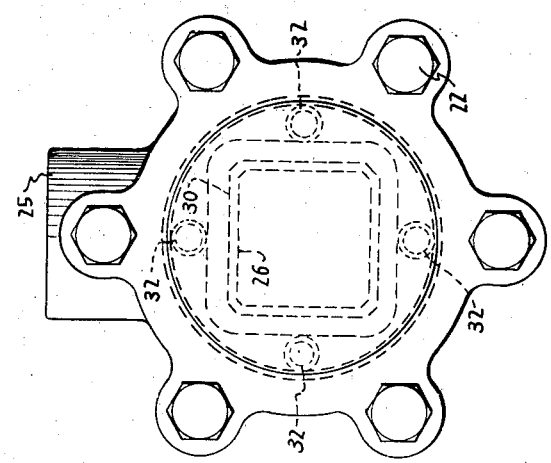

In the drawing,

Fig. 1 is a longitudinal cross-sectional view of the rotary joint embodying the present invention, and Fig. 2 is an end view of Fig. 1 as viewed from the left.

In the illustrated form of the invention, the casing 10 is stationary while the tubular connecting member or nipple 12 is threaded at 14 for connection to a rotatable member, such as the steam drum of a paper drier. The ends of the casing 10 are closed by a plate 16 at one end and a bearing ring seat plate 18 apertured at 20 to receive the nipple 12. Screws 22 removably support the plate 18 permitting the same to be renewed without scrapping the entire casing as in the case of the construction shown in the aforesaid patent. Its removability also facilitates re-machining of the vertical flat seat 24 which in service might become worn. The casing 10 is provided in one side thereof with a fluid connector 25.

The plate 16 is provided with a squared sleeve 26 with which the thrust plate 28, having a similarly shaped opening 30, telescopes. This arrangement prevents relative rotation between the plate 28 and the casing 10, while permitting the plate 28 to slide axially under the stress of the springs 32. While a single large coil spring may be used or its equivalent, we prefer to use a plurality of small springs 32 so that breakage of a spring will not result in the interruption of the operation of the joint.

As illustrated, the nipple 12 is of one piece construction with spaced shoulder portions 34 and 36 providing convex bearing surfaces in the form of spherical segments. Sealing rings 38 having flat bearing surfaces 40 and concave bearing surfaces 42 in the form of spherical segments co-act with the convex surfaces of the shoulders 34 and 36 and the flat vertical surfaces 24 and 44 in the same manner as described in the aforesaid patent. The tension of the springs 32 keeps the sealing rings 38 in firm contact with the bearing surfaces of the nipple 12 and the plates 18 and 28. Between the shoulders 34 and 36 in the nipple 12 are a plurality of openings 43.

From the foregoing specification it will be apparent that there is provided a rotary joint providing a fluid passage from the connector 25 through the openings 43 and the nipple 12 and that the sealing pressure is provided by the springs 32.

Having thus described our invention what we desire to secure by Letters Patent and claim is:

1. In a joint of the character described, the combination with a stationary casing having opposed bearing ring seats, and bearing rings slidably seated thereon having concave bearing surfaces in the form of spherical segments, a one piece rotable tubular member extending into said casing and having spaced shoulders provided with convex bearing surfaces in the form of spherical segments co-acting with said concave bearing surfaces, one of said opposed bearing ring seats being movable toward the other and spring means for urging said movable seat toward said opposed seat to hold said bearing ring between said seats and said tubular member.

2. In a rotary joint of the class described, a fixed bearing ring seat, an opposed axial movable bearing ring seat, a rotatable nipple disposed between said seats, sealing rings disposed between said seats and said nipple, means for urging said movable seat toward said nipple, a main body portion to which said first seat is fixedly secured, and means carried by the said main body for guiding and holding said movable seat against rotation.

LEONARD D. GOFF.
ROLLO O. MONROE.